US008766975B2

(12) United States Patent
Mohr et al.

(10) Patent No.: US 8,766,975 B2
(45) Date of Patent: Jul. 1, 2014

(54) METHOD OF CORRELATING IMAGES WITH TERRAIN ELEVATION MAPS FOR NAVIGATION

(75) Inventors: Benjamin Mohr, St. Louis Park, MN (US); Yunqian Ma, Plymouth, MN (US); Michael Ray Elgersma, Plymouth, MN (US); John B. McKitterick, Columbia, MD (US)

(73) Assignee: Honeywell International Inc., Morristown, NJ (US)

( * ) Notice: Subject to any disclaimer, the term of this patent is extended or adjusted under 35 U.S.C. 154(b) by 139 days.

(21) Appl. No.: 13/553,281

(22) Filed: Jul. 19, 2012

(65) Prior Publication Data

US 2014/0022262 A1 Jan. 23, 2014

(51) Int. Cl.
*G06T 15/00* (2011.01)
*G06F 17/00* (2006.01)
*G06T 1/00* (2006.01)

(52) U.S. Cl.
USPC ............................................. 345/419; 345/418

(58) Field of Classification Search
CPC ....... G06F 17/00–17/608; G06T 1/00–1/0092; G06T 15/00–15/005
USPC ........... 345/418, 419; 701/400, 408, 409, 461
See application file for complete search history.

(56) References Cited

U.S. PATENT DOCUMENTS

| 5,485,384 A | 1/1996 | Falconnet |
|---|---|---|
| 5,762,292 A | 6/1998 | Schweyer et al. |
| 5,991,460 A | 11/1999 | Mitchell |
| 6,362,775 B1 | 3/2002 | Goebel et al. |
| 7,967,255 B2 | 6/2011 | Head et al. |
| 2010/0268458 A1* | 10/2010 | Becker et al. ................. 701/208 |
| 2011/0233322 A1 | 9/2011 | Holicki et al. |
| 2012/0271546 A1* | 10/2012 | Pyne et al. .................... 701/443 |

FOREIGN PATENT DOCUMENTS

DE 69306069 4/1997

OTHER PUBLICATIONS

Stevens et al., "Motion Imagery Navigation Using Terrain Estimates", Aug. 2004, pp. 1-4, Publisher: IEEE.
Vaidya et al., "Experiments in Semiautonomous Registration of Disparate Spatial Data: Two New Techniques and a Model for Comparison", Nov. 1995, pp. 407-412, Publisher: IEEE.

* cited by examiner

*Primary Examiner* — Jacinta M Crawford
(74) *Attorney, Agent, or Firm* — Fogg & Powers LLC

(57) ABSTRACT

A method for navigation comprises constructing a current map that includes two-dimensional or three dimensional representations of an area, detecting one or more edge features on the current map, and generating a first fine-edge map based on the edge features. The method further comprises retrieving a historical map that includes two-dimensional or three dimensional representations of the area, detecting one or more edge features on the historical map, and generating a second fine-edge map based on the edge features. Thereafter, a coarse version of the current map is generated from the first fine-edge map, and a coarse version of the historical map is generated from the second fine-edge map. The coarse versions of the current and historical maps are then correlated to determine a first position and orientation. The first fine-edge map is then correlated with the second fine-edge map to determine a second, more accurate, position and orientation.

20 Claims, 4 Drawing Sheets

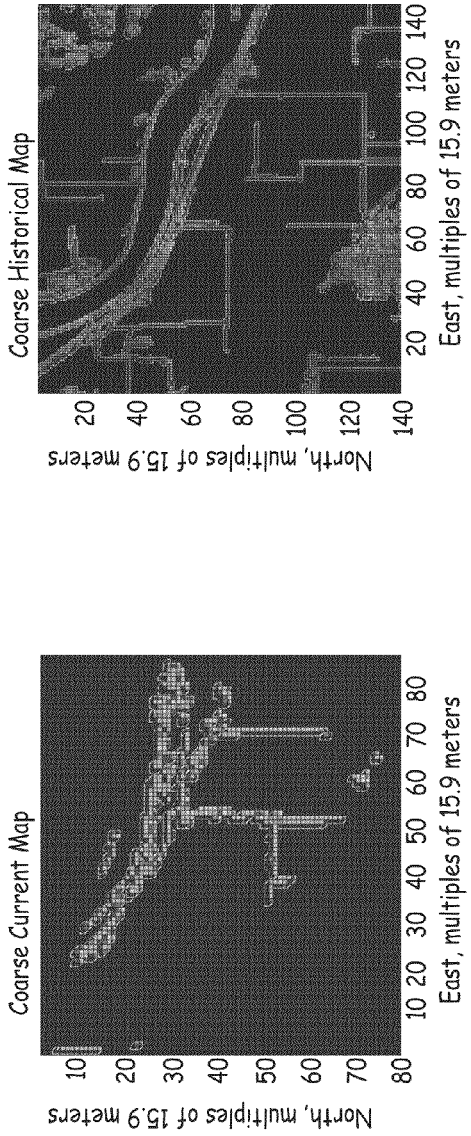
FIG. 4A
FIG. 4B
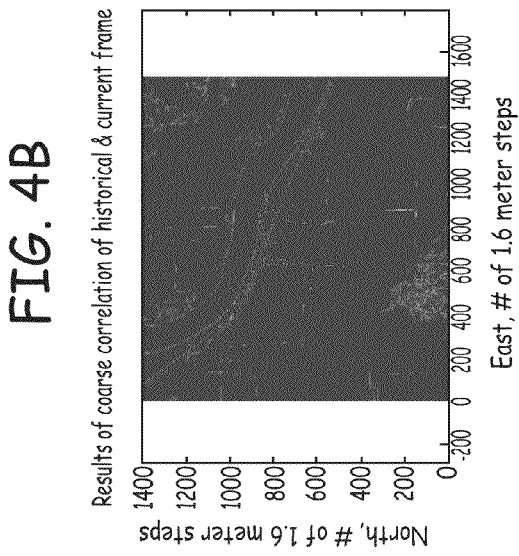
FIG. 5A
FIG. 5B

METHOD OF CORRELATING IMAGES WITH TERRAIN ELEVATION MAPS FOR NAVIGATION

BACKGROUND

Terrain correlation and image correlation techniques have been used for military airborne navigation for some time. In terrain correlation, a geo-referenced elevation map, such as a digital terrain elevation database (DTED), is correlated against a measurement of the ground elevation taken from an aircraft using a ranging sensor such as a radar device or a LADAR (Laser Detection and Ranging) device. The map surface and sensor generated surface are compared using a two dimensional correlation algorithm operating in the elevation domain, which generates a maximum correlation when the two surfaces are perfectly overlaid. This operation produces an estimate of the offset between the two, and because the elevation map is geo-referenced, an estimate of the error in the aircraft position. The error estimate may be used in a navigation system to correct position error using a Kalman Filter or other correction technique.

Image correlation techniques work in a similar fashion. An image taken from an aircraft is correlated in the intensity domain against a georeferenced image database. The maximum correlation occurs when the two images are perfectly overlaid. The amount which the airborne image must be shifted or rotated provides an estimate of navigation error.

There are both advantages and limitations to terrain correlation and image correlation navigation methods. Terrain correlation techniques often use DTED databases, which cover virtually the entire planet, are relatively compact in terms of data storage, and are already widely used in military applications. However, the ranging sensors required for terrain correlation are typically large, heavy, expensive, and active. In addition, as the ranging sensors emit energy in the RADAR or other bands, these sensors are easily detected by adversaries. In contrast, while image correlation can be performed with small, inexpensive cameras, geo-referenced databases have extremely large storage requirements, which are prohibitive for some applications. Further, both terrain and image correlation techniques have the disadvantage of being computationally intensive, imposing high performance requirements on the processing system.

SUMMARY

A method for navigation comprises constructing a current map that includes one or more two-dimensional or three dimensional representations of an area, detecting one or more edge features on the current map, and generating a first fine-edge map based on the detected edge features on the current map. The method further comprises retrieving a historical map that includes one or more two-dimensional or three dimensional representations of the area, detecting one or more edge features on the historical map, and generating a second fine-edge map based on the detected edge features on the historical map. Thereafter, a coarse version of the current map is generated from the first fine-edge map, and a coarse version of the historical map is generated from the second fine-edge map. The coarse version of the current map is then correlated with the coarse version of the historical map to determine a first position and orientation. The first fine-edge map is correlated with the second fine-edge map using the first position and orientation to determine a second position and orientation that is more accurate than the first position and orientation.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 4A is a coarse current map generated from the fine-edge current map of FIG. 2B;

FIG. 4B is a coarse historical map generated from the fine edge historical map shown in FIG. 3B;

FIG. 5A shows the results of sliding the coarse current map of FIG. 4A over the coarse historical map of FIG. 4B;

FIG. 5B shows the results of the correlation of the coarse current map of FIG. 4A and the coarse historical map of FIG. 4B.

DETAILED DESCRIPTION

Figure 1:
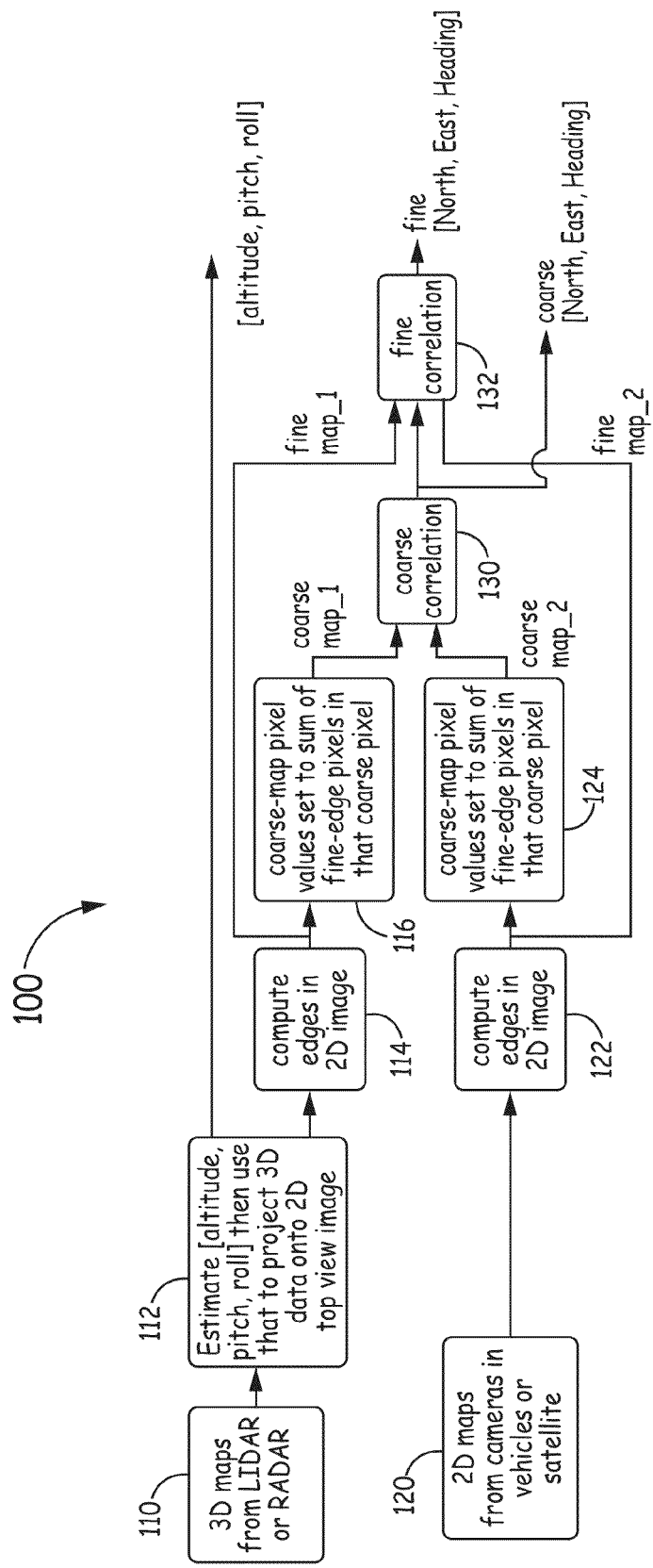
FIG. 1 is a flow diagram of a method for performing correlation using a current map and a historical map according to one approach.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method of performing correlation between images and elevation maps is provided. The present method provides for correlation of two-dimensional (2-D) and three-dimensional (3-D) maps, either of which can be stored earlier or generated by a traveling vehicle such as an aircraft. The present approach enables the use of inexpensive sensors with the low storage requirements of a terrain database.

The present approach utilizes 2-D and 3-D maps generated from 2-D and 3-D images, respectively. One of the maps is typically a pre-stored "historical" map that has known coordinates, while the other map is the "current" map taken from a vehicle that is trying to figure out its location. The vehicle determines its location by comparing the current map to the stored historical map, and determines how much those two maps need to be shifted and rotated in order for the maps to overlay each other accurately. This process of comparison is called "correlation." In order to speed up the correlation process, coarse versions of the maps are first correlated to give an approximate position and orientation, which is then used to initialize the fine correlation.

The present technique works based on the assumption that there are many physical structures which cause edges in both elevation data and camera data. This technique relies on high relief in the terrain. Areas which include natural high relief, such as canyons or bluffs, will work, but the technique is particularly applicable to elevation databases which include man-made features, such as buildings, which have sharp edges. This type of elevation map can be generated from an aerial ladar (or LIDAR—Light Detection and Ranging) survey.

The present approach applies an edge detection algorithm to each of the maps. Different types of images may have different types of features that allow edges to be detected, but there is often enough similarity that different types of images can still be compared to determine their relative positions and orientations. An edge detection technique computes a gradient by differencing adjacent elements in both the horizontal and vertical directions. The result is a two dimensional gradient vector at each element location.

A threshold can be applied to the magnitude of the gradient to produce a binary image which represents high contrasts points, i.e., edges. This technique may be applied to both terrain elevation data and camera intensity data, producing an image in the "edge domain" for both. These binary edge domain representations may then be correlated using standard image correlation techniques. Because the images are binary, the computational requirements for the correlation are greatly reduced.

While the present technique is described here in the context of correlating a three dimensional surface map to an image taken from the aircraft, this technique can be extended to numerous other sensor combinations as well. An example of this is correlating a millimeter wave radar (3-dimensional) image taken from an aircraft to a geo-referenced optical image database. The present approach provides the ability to correlate two samples from disparate data types by first converting the samples to the edge domain, and performing a correlation operation between the two edge domain representations. Because the two samples may be observed from different points of view, proper correlation of the two edge domain representations may require rotation as well as translation. In a typical application, an inertial navigation system provides the initial transformation, and the maximum correlation is determined by computing the correlation values corresponding to variations in position or attitude about this initial transformation.

In a further approach, which enables use with DTED in lower terrain relief areas, higher order derivates of the gradient are computed. The gradient provides the slope of the terrain, while the derivative (difference) of the gradient provides changes in slope such as peaks, valleys, and ridgelines. These features may then be detected with a threshold process, such that when the derivative is above a certain value an edge is considered to be present, and when the derivative is below the value an edge is not considered to be present. Because these features tend to be associated with edges in the visual domain (shadows, etc.), the derivative of the DTED gradient may then be correlated with the image edges.

The present approach estimates the transformation between the two edge-domain images, which represents the error in the airborne navigation system. This estimate can then be applied to the navigation system as a correction. The present method reduces the search space by using the current navigation position to determine what areas of the terrain database are likely in view, and only attempts to match the image to that local neighborhood.

The present method may be implemented in software using image processing techniques including computation of the gradient and edge detection.

FIG. 1 is a flow diagram of a method 100 for performing correlation using a current map and a historical map according to one approach. In method 100, 3-D maps of an area are utilized, which can be generated from lidar or radar images (block 110). The lidar or radar images can be collected by an aircraft flying over the area to generate a current map. Alternatively, the lidar or radar images can be from a historical map that is stored on the aircraft. The method 100 also employs 2-D maps, which can be generated from optical images taken by one or more cameras (block 120). The optical images can be collected by an aircraft flying over the area to generate a current map, or can be satellite or aerial photographs from a historical map that is previously stored.

The method 100 estimates the altitude, pitch angle, and roll angle of the aircraft, which is used to project the 3-D data from the 3-D maps onto a 2-D top view of the same images (block 112). The method 100 then computes the edge features in the 2-D images (block 114) and generates a first fine-edge map. Coarse-map pixel values are then set to the sum of the fine-edge pixels within each coarse pixel (block 116), and a first coarse map is generated. The term "coarse" means a coarser resolution of the map, where one pixel in the coarse-map can be corresponding to several pixels in the fine-map.

The method 100 also computes the edge features in the 2-D images taken by the cameras (block 122), and generates a second fine-edge map. Coarse-map pixel values are then set to the sum of fine-edge pixels within each coarse pixel (block 124), and a second coarse map is generated.

The first and second coarse maps are used in a coarse correlation process to determine coarse parameters of north, east, and heading angle (block 130). In an optional extension, pitch and roll may also be determined. The results of the coarse correlation are then used along with the first and second fine-edge maps in a fine correlation process to determine fine parameters of north, east, and heading angle (block 132). The term "fine" means a finer resolution of the map.

Figure 2A:
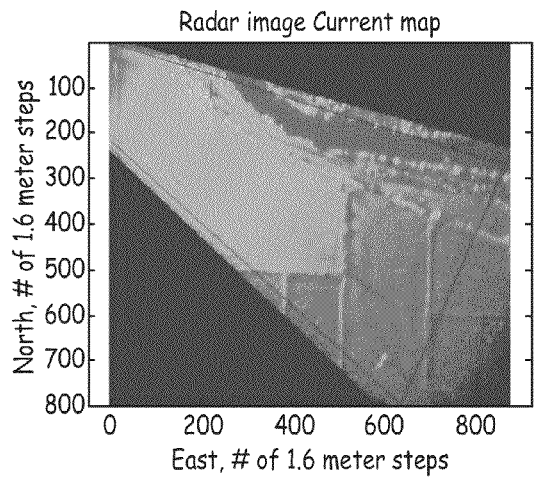
FIG. 2A is a radar image of an area from a current map obtained by an aircraft during flight.
Figure 3A:
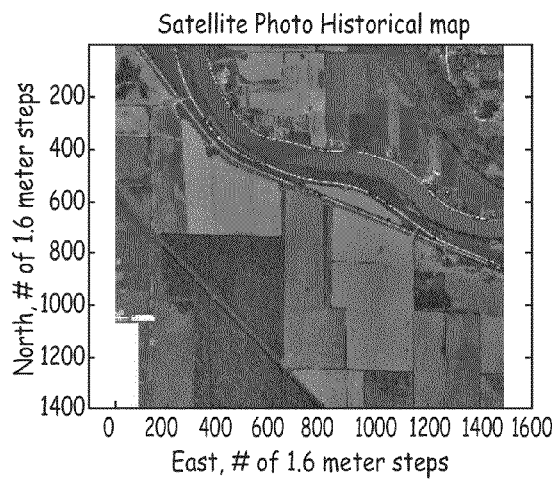
FIG. 3A is a satellite photograph of the same area from a historical map.

In an exemplary method, a current map is generated that includes 3-D radar images of an area collected by an aircraft during flight. FIG. 2A is an exemplary 3-D radar image of a selected area from a current map obtained by an aircraft, in which the current map has a resolution of 1.6 meters. The method compares (correlates) the 3-D radar images with 2-D satellite photographs of the same area taken at an earlier time and stored in a historical map. FIG. 3A is an exemplary satellite photograph from a historical map that corresponds to the selected area shown in the radar image of FIG. 2A, in which the historical map also has a resolution of 1.6 meters.

Both the current map and the historical map are preprocessed using altitude, pitch angle, and roll angle to give a top view, so that the only variables remaining are north, east, and heading angle. Satellite maps have known coordinates, so to figure out where the aircraft is, the radar image is compared to the satellite image. This correlation is done by rotating then sliding the radar image in north and east directions, until it fits the satellite image.

Figure 2B:
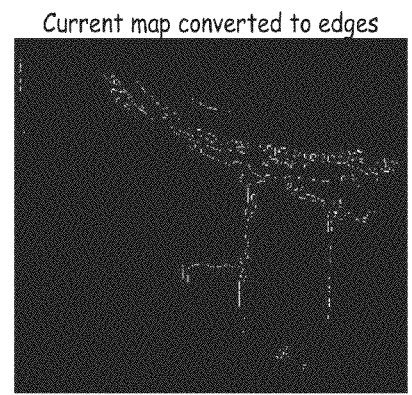
FIG. 2B depicts the radar image of FIG. 2A converted to show only the edges in a fine-edge current map.
Figure 3B:
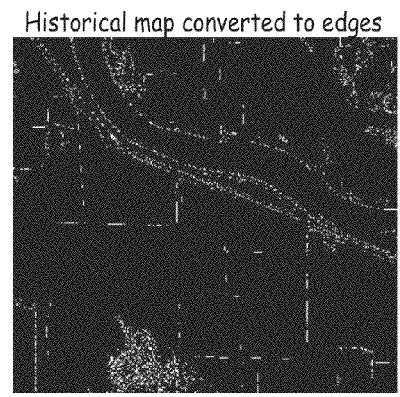
FIG. 3B depicts the satellite photograph of FIG. 3A converted to show only the edges in a fine-edge historical map.

The radar image of FIG. 2A is 800-by-800 pixels, and the satellite image of FIG. 3A is 1400-by-1400 pixels. Thus, rotating and sliding the current map and the historical map by 1 pixel at a time in each direction, then doing the comparison at each position, would take too long. To speed up the correlation process, the images in the current map and the historical map are run through a standard edge-detection algorithm. FIG. 2B depicts the radar image of FIG. 2A converted to show the edges in a fine-edge current map. FIG. 3B depicts the satellite photograph of FIG. 3A converted to show the edges in a fine-edge historical map.

Thereafter, small coarse maps are generated for the current map and the historical map by storing the number of edge pixels in each 10-by-10 fine-pixel block into a single coarse pixel. One frame from a generated coarse current map is shown in FIG. 4A, with a resolution of 15.9 meters, and one frame from a generated coarse historical map is shown in FIG. 4B, also with a resolution of 15.9 meters. This fine-to-coarse conversion to speed up correlation is described in further detail in copending U.S. application Ser. No. 13/302,831, entitled RAPID LIDAR IMAGE CORRELATION FOR GROUND NAVIGATION, the disclosure of which is incorporated by reference.

FIG. 5A shows the results of sliding the frame from the coarse current map of FIG. 4A over the frame from the coarse historical map of FIG. 4B. The coarse current map is shifted one coarse pixel at a time, and then its pixels are subtracted from the coarse historical map pixels. In this example, the coarse $[x, y, \psi]$ frame correlation error surface is shown as a surface with $[x, y]$ coordinates for a fixed value of $\psi_{coarse\ optimum} = 1.35$ degrees, where $\psi_{coarse\ optimum}$ is the heading, $\psi$, shift that gives the best map correlation, while x=East and y=North. In this example, the global coarse correlation took 24.4 seconds.

The process was repeated for each rotation angle ($\psi$) from −4 degrees to +3.64 degrees in 0.38 degree steps, with the [East shift, North shift] result plotted for the best angle, as depicted in FIG. 5A.

After the coarse shift and rotation are computed, the coarse results are applied to the original fine-edge maps (FIGS. 2B and 3B). The results of the coarse correlation are shown in FIG. 5B. In this example, the coarse results were accurate to within one coarse pixel, which is around 16 meters. The coarse results are then used to start a fine-pixel correlation, since the search was narrowed down to 16 meters in north and east coordinates. Thus, the 1.6 meter resolution fine-edge maps only have to be shifted by 16 pixels, rather than over the full 800 pixel width.

Figure 6:
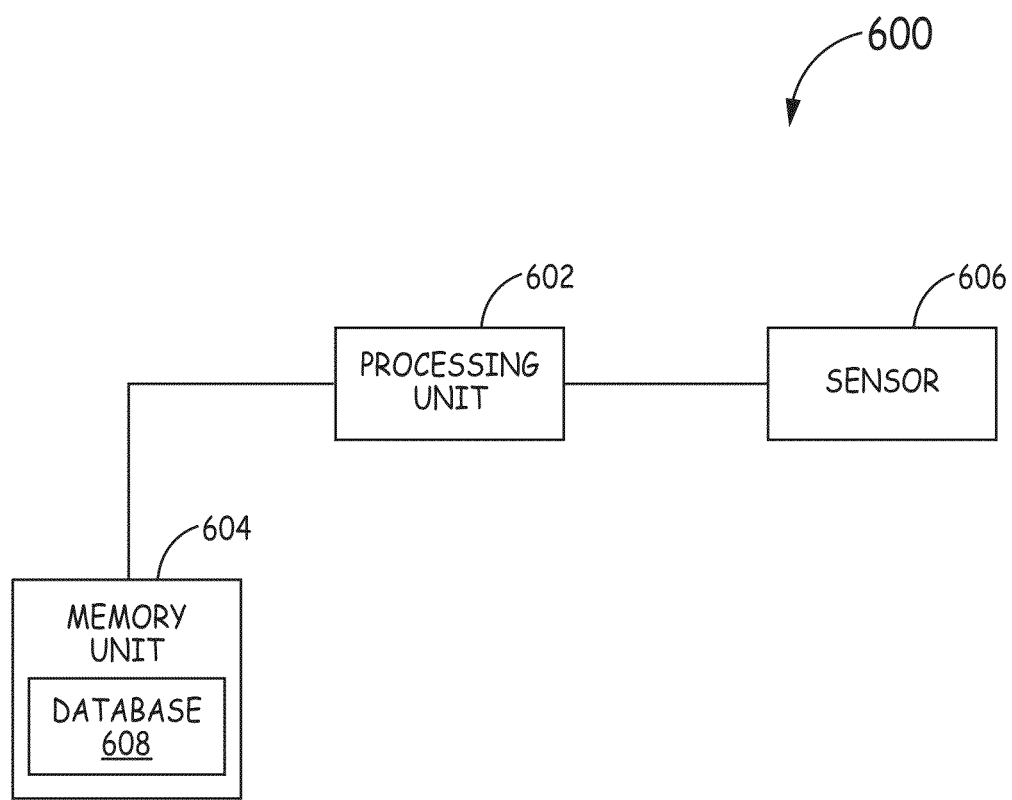
FIG. 6 is a block diagram of a navigation system according to one embodiment.

FIG. 6 is a block diagram of one embodiment of a navigation system 600, which can implement the present technique. The system 600 includes at least one processing unit 602, and at least one memory unit 604 operatively coupled to the processing unit 602. At least one sensor 606 is in operative communication with processing unit 602. The sensor 606 can be an optical camera, a lidar device, a radar device, or the like. The memory unit 604 includes a database 608 that stores terrain elevation data in a historical map.

A processor for use in the present method and system can be implemented using software, firmware, hardware, or any appropriate combination thereof, as known to one of skill in the art. By way of example and not limitation, hardware components for the processor can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). The processor includes or functions with software programs, firmware, or other computer readable instructions for carrying out various process tasks, calculations, and control functions, used in the present method. These instructions are typically tangibly embodied on any appropriate computer program product that includes a computer readable medium used for storage of computer readable instructions or data structures.

The present method can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

The present methods can be implemented by computer executable instructions, such as program modules, which are executed by at least one processor. Generally, program modules include routines, programs, objects, data components, data structures, algorithms, and the like, which perform particular tasks or implement particular abstract data types.

EXAMPLE EMBODIMENTS

Example 1 includes a method for navigation comprising: constructing a current map that includes one or more two-dimensional or three dimensional representations of an area; detecting one or more edge features on the current map; generating a first fine-edge map based on the detected edge features on the current map; retrieving a historical map that includes one or more two-dimensional or three dimensional representations of the area; detecting one or more edge features on the historical map; generating a second fine-edge map based on the detected edge features on the historical map; generating a coarse version of the current map from the first fine-edge map; generating a coarse version of the historical map from the second fine-edge map; correlating the coarse version of the current map with the coarse version of the historical map to determine a first position and orientation; and correlating the first fine-edge map with the second fine-edge map using the first position and orientation to determine a second position and orientation that is more accurate than the first position and orientation.

Example 2 includes the method of Example 1, wherein the current map is constructed from optical images taken by one or more cameras on an aircraft during flight.

Example 3 includes the method of any of Examples 1 and 2, wherein the historical map comprises two-dimensional or three-dimensional lidar or radar images.

Example 4 includes the method of any of Examples 1 and 2, wherein the historical map comprises a digital terrain elevation database.

Example 5 includes the method of Example 1, wherein the current map includes two-dimensional or three-dimensional images constructed from range data obtained by one or more range sensors on an aircraft during flight.

Example 6 includes the method of Example 5, wherein the range data is obtained from a lidar device.

Example 7 includes the method of Examples 5, wherein the range data is obtained from a radar device.

Example 8 includes the method of any of Examples 5-7, wherein the historical map comprises an optical image database.

Example 9 includes the method of Example 8, wherein the optical image database includes one or more satellite or aerial photographs.

Example 10 includes the method of any of Examples 1-9, wherein the current map and the historical map are preprocessed using altitude, pitch angle, and roll angle to produce a top view of each map.

Example 11 includes the method of any of Examples 1-10, wherein correlating the first fine-edge map with the second fine-edge map comprises rotating and then sliding the representations in the current map in north and east directions until the representations in the current map are aligned with the representations in the historic map.

Example 12 includes a system for navigation comprising a processor, and a memory unit comprising a computer readable medium having instructions executable by the processor to perform a method comprising: constructing a current map that includes two-dimensional (2-D) images or three-dimensional (3-D) images of an area; detecting one or more edge features on the current map; generating a first fine-edge map based on the detected edge features on the current map; retrieving a historical map of the area having 2-D images or 3-D images; detecting one or more edge features on the historical map; generating a second fine-edge map based on the detected edge features on the historical map; generating a coarse version of the current map from the first fine-edge map; generating a coarse version of the historical map from the second fine-edge map; correlating the coarse version of the current map with the coarse version of the historical map to determine a first position and orientation; and correlating the first fine-edge map with the second fine-edge map using the first position and orientation to determine a second position and orientation that is more accurate than the first position and orientation.

Example 13 includes the system of Example 12, further comprising one or more cameras on an aircraft configured to capture optical images during flight.

Example 14 includes the system of any of Examples 12 and 13, wherein the historical map comprises three-dimensional lidar or radar images stored in the memory unit.

Example 15 includes the system of any of Examples 12 and 13 wherein the historical map comprises a digital terrain elevation database stored in the memory unit.

Example 16 includes the system of Example 12, further comprising one or more range sensors on an aircraft configured to obtain range data during flight.

Example 17 includes the system of Example 16, wherein the range sensors comprise a lidar device or a radar device.

Example 18 includes the system of any of Examples 16 and 17, wherein the historical map comprises an optical image database stored in the memory unit, the optical image database including one or more satellite or aerial photographs.

Example 19 includes a computer program product comprising a non-transitory computer readable medium having instructions executable by a processor to perform a method comprising: constructing a current map that includes one or more two-dimensional or three dimensional representations of an area; detecting one or more edge features on the current map; generating a first fine-edge map based on the detected edge features on the current map; retrieving a historical map that includes one or more two-dimensional or three dimensional representations of the area; detecting one or more edge features on the historical map; generating a second fine-edge map based on the detected edge features on the historical map; generating a coarse version of the current map from the first fine-edge map; generating a coarse version of the historical map from the second fine-edge map; correlating the coarse version of the current map with the coarse version of the historical map to determine a first position and orientation; and correlating the first fine-edge map with the second fine-edge map using the first position and orientation to determine a second position and orientation that is more accurate than the first position and orientation.

Example 20 includes the computer program product of Example 19, wherein correlating the first fine-edge map with the second fine-edge map comprises rotating and then sliding the representations in the current map in north and east directions until the representations in the current map are aligned with the representations in the historic map.

The present invention may be embodied in other forms without departing from its essential characteristics. The described embodiments are to be considered in all respects only as illustrative and not restrictive. Therefore, it is intended that this invention be limited only by the claims and the equivalents thereof.

What is claimed is:

1. A method for navigation, comprising:
   constructing, with a processor, a current map that includes one or more two-dimensional or three dimensional representations of an area;
   detecting one or more edge features on the current map with the processor;
   generating a first fine-edge map based on the detected edge features on the current map with the processor;
   retrieving from a memory unit a historical map that includes one or more two-dimensional or three dimensional representations of the area;
   detecting one or more edge features on the historical map with the processor;
   generating a second fine-edge map based on the detected edge features on the historical map with the processor;
   generating a coarse version of the current map from the first fine-edge map with the processor;
   generating a coarse version of the historical map from the second fine-edge map with the processor;
   correlating the coarse version of the current map with the coarse version of the historical map with the processor to determine a first position and orientation; and
   correlating, with the processor, the first fine-edge map with the second fine-edge map using the first position and orientation to determine a second position and orientation that is more accurate than the first position and orientation.

2. The method of claim 1, wherein the current map is constructed from optical images taken by one or more cameras on an aircraft during flight.

3. The method of claim 2, wherein the historical map comprises two-dimensional or three-dimensional lidar or radar images.

4. The method of claim 2, wherein the historical map comprises a digital terrain elevation database.

5. The method of claim 1, wherein the current map includes two-dimensional or three-dimensional images constructed from range data obtained by one or more range sensors on an aircraft during flight.

6. The method of claim 5, wherein the range data is obtained from a lidar device.

7. The method of claim 5, wherein the range data is obtained from a radar device.

8. The method of claim 5, wherein the historical map comprises an optical image database.

9. The method of claim 8, wherein the optical image database includes one or more satellite or aerial photographs.

10. The method of claim 1, wherein the current map and the historical map are preprocessed using altitude, pitch angle, and roll angle to produce a top view of each map.

11. The method of claim 1, wherein correlating the first fine-edge map with the second fine-edge map comprises rotating and then sliding the representations in the current map in north and east directions until the representations in the current map are aligned with the representations in the historic map.

12. A system for navigation, comprising:
a processor; and
a memory unit comprising a computer readable medium having instructions executable by the processor to perform a method comprising:
constructing a current map that includes two-dimensional (2-D) images or three-dimensional (3-D) images of an area;
detecting one or more edge features on the current map;
generating a first fine-edge map based on the detected edge features on the current map;
retrieving a historical map of the area having 2-D images or 3-D images;
detecting one or more edge features on the historical map;
generating a second fine-edge map based on the detected edge features on the historical map;
generating a coarse version of the current map from the first fine-edge map;
generating a coarse version of the historical map from the second fine-edge map;
correlating the coarse version of the current map with the coarse version of the historical map to determine a first position and orientation; and
correlating the first fine-edge map with the second fine-edge map using the first position and orientation to determine a second position and orientation that is more accurate than the first position and orientation.

13. The system of claim 12, further comprising one or more cameras on an aircraft configured to capture optical images during flight.

14. The system of claim 13, wherein the historical map comprises three-dimensional lidar or radar images stored in the memory unit.

15. The system of claim 13, wherein the historical map comprises a digital terrain elevation database stored in the memory unit.

16. The system of claim 12, further comprising one or more range sensors on an aircraft configured to obtain range data during flight.

17. The system of claim 16, wherein the range sensors comprise a lidar device or a radar device.

18. The system of claim 16, wherein the historical map comprises an optical image database stored in the memory unit, the optical image database including one or more satellite or aerial photographs.

19. A computer program product, comprising:
a non-transitory computer readable medium having instructions executable by a processor to perform a method comprising:
constructing a current map that includes one or more two-dimensional or three dimensional representations of an area;
detecting one or more edge features on the current map;
generating a first fine-edge map based on the detected edge features on the current map;
retrieving a historical map that includes one or more two-dimensional or three dimensional representations of the area;
detecting one or more edge features on the historical map;
generating a second fine-edge map based on the detected edge features on the historical map;
generating a coarse version of the current map from the first fine-edge map;
generating a coarse version of the historical map from the second fine-edge map;
correlating the coarse version of the current map with the coarse version of the historical map to determine a first position and orientation; and
correlating the first fine-edge map with the second fine-edge map using the first position and orientation to determine a second position and orientation that is more accurate than the first position and orientation.

20. The computer program product of claim 19, wherein correlating the first fine-edge map with the second fine-edge map comprises rotating and then sliding the representations in the current map in north and east directions until the representations in the current map are aligned with the representations in the historic map.

* * * * *